US012530317B2

United States Patent
Dhulipala et al.

(10) Patent No.: US 12,530,317 B2
(45) Date of Patent: Jan. 20, 2026

(54) STORAGE AND RETRIEVAL OF FILESYSTEM METADATA

(71) Applicant: Rubrik, Inc., Palo Alto, CA (US)

(72) Inventors: Chandrashekhar Dhulipala, Sunnyvale, CA (US); Anuj Dhawan, Mountain View, CA (US); Muraliraja Muniraju, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/423,114

(22) Filed: Jan. 25, 2024

(65) Prior Publication Data

US 2025/0245199 A1    Jul. 31, 2025

(51) Int. Cl.
| | |
|---|---|
| G06F 7/00 | (2006.01) |
| G06F 16/11 | (2019.01) |
| G06F 16/14 | (2019.01) |
| G06F 16/16 | (2019.01) |
| G06F 16/17 | (2019.01) |
| G06F 17/00 | (2019.01) |

(52) U.S. Cl.
CPC .......... *G06F 16/164* (2019.01); *G06F 16/128* (2019.01); *G06F 16/156* (2019.01); *G06F 16/1734* (2019.01)

(58) Field of Classification Search
CPC .. G06F 16/164; G06F 16/156; G06F 16/1734; G06F 16/128
USPC ........................................................ 707/737
See application file for complete search history.

(56) References Cited

U.S. PATENT DOCUMENTS

| | | | |
|---|---|---|---|
| 11,042,503 B1* | 6/2021 | Vig ..................... | G06F 11/1451 |
| 11,971,858 B2* | 4/2024 | Doddaiah ............... | G06F 16/11 |
| 2007/0130171 A1* | 6/2007 | Hanckel .............. | G06F 16/2477 |
| 2008/0046476 A1* | 2/2008 | Anderson ............. | G06F 16/128 |
| 2011/0189980 A1* | 8/2011 | Proulx .................... | G06F 16/48 |
| | | | 455/414.1 |
| 2012/0078855 A1* | 3/2012 | Beatty ................. | G06F 11/1451 |
| | | | 707/E17.007 |
| 2013/0262800 A1* | 10/2013 | Goodman ............. | G06F 3/0647 |
| | | | 711/E12.002 |
| 2021/0133245 A1* | 5/2021 | Reehil ................. | H04L 41/0806 |
| 2021/0152595 A1* | 5/2021 | Hansen ................. | G06F 21/568 |
| 2021/0232604 A1* | 7/2021 | Sundaram ......... | G06F 16/24534 |

(Continued)

*Primary Examiner* — Pavan Mamillapalli
(74) *Attorney, Agent, or Firm* — Holland & Hart LLP

(57) ABSTRACT

Methods, systems, and devices for data management are described. A data management system (DMS) may be employed to manage data associated with one or more computing systems. The DMS may generate metadata when capturing snapshots, which may contain information corresponding to files that have been created, deleted, modified, or otherwise changed since a prior snapshot. The DMS may use learning techniques and experimentation to perform data engineering to analyze metadata such as to perform anomaly detection. The DMS may implement techniques for efficiently storing and organizing metadata for use with machine learning processes—e.g., to support efficiently extracting datasets useful for machine learning experimentation. To obtain a dataset, the DMS may read metadata from different partitions of a storage environment in parallel, and accordingly, metadata may be stored in separate partitions based on customers and time ranges (e.g., to support such parallel reading).

20 Claims, 8 Drawing Sheets

(56) References Cited

U.S. PATENT DOCUMENTS

| | | | |
|---|---|---|---|
| 2021/0312066 A1* | 10/2021 | Hansen | G06F 11/1451 |
| 2024/0078213 A1* | 3/2024 | Doddaiah | G06F 16/178 |
| 2024/0275814 A1* | 8/2024 | George | H04L 63/1425 |

* cited by examiner

STORAGE AND RETRIEVAL OF FILESYSTEM METADATA

FIELD OF TECHNOLOGY

The present disclosure relates generally to data management, including techniques for storage and retrieval of filesystem metadata.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may include various nodes, clusters, and sub-systems that provide backup and recovery services for client systems. Backup processes involve capturing snapshots of customer computing objects. The DMS may generate metadata when capturing snapshots, for example, in the form of differential filesystem metadata (diff FMD) files which contain information corresponding to files that have been created, deleted, modified, or otherwise changed since a prior snapshot. The DMS may also capture aggregated metadata (e.g., statistics) for snapshots (e.g., the total number of files that changed since a prior snapshot, the total size of the snapshot, the total number of files in the snapshot). Along with supporting backup and recovery options, the DMS may use machine learning techniques to predict or detect anomalies (e.g., ransomware or malware detection) based on the system metadata. The metadata for an individual snapshot may have millions of entries capturing changes across the filesystem, and as the DMS may manage backup operations for a large quantity (e.g., thousands) of clients, the scale of the metadata across the DMS may be large. Accordingly, filtering and reading filesystem metadata to obtain a dataset for input to a machine learning program for training or anomaly detection purposes may be inefficient and time-intensive.

Aspects of the present disclosure support techniques for efficiently storing and organizing filesystem metadata for use with machine learning processes—e.g., to support efficiently extracting datasets useful for machine learning experimentation, training, or other purposes (e.g., any big data purposes). To obtain a dataset, the DMS may read metadata from different partitions of a storage environment (e.g., a cloud storage environment) in parallel, and accordingly, metadata may be stored in separate partitions based on customers and time ranges (e.g., to support such parallel reading with improved efficiency, among other possible benefits). Accordingly, when the DMS receives a request to retrieve metadata that indicates a customer (or set of customers) and time range, the DMS may identify the partitions that correspond to the indicated customer(s) and time range and may read the identified partitions in parallel. Thus, the requested metadata may be quickly identified and retrieved for feeding to a machine learning process. In addition, the metadata may be stored in a column-based format (e.g., Parquet file format) where the columns correspond to different types of metadata or different portions of files. Accordingly, if the request indicates a particular type of metadata, the DMS may query the corresponding columns from the files in the partitions without reading entire files, thereby decreasing read time.

Figure 1:
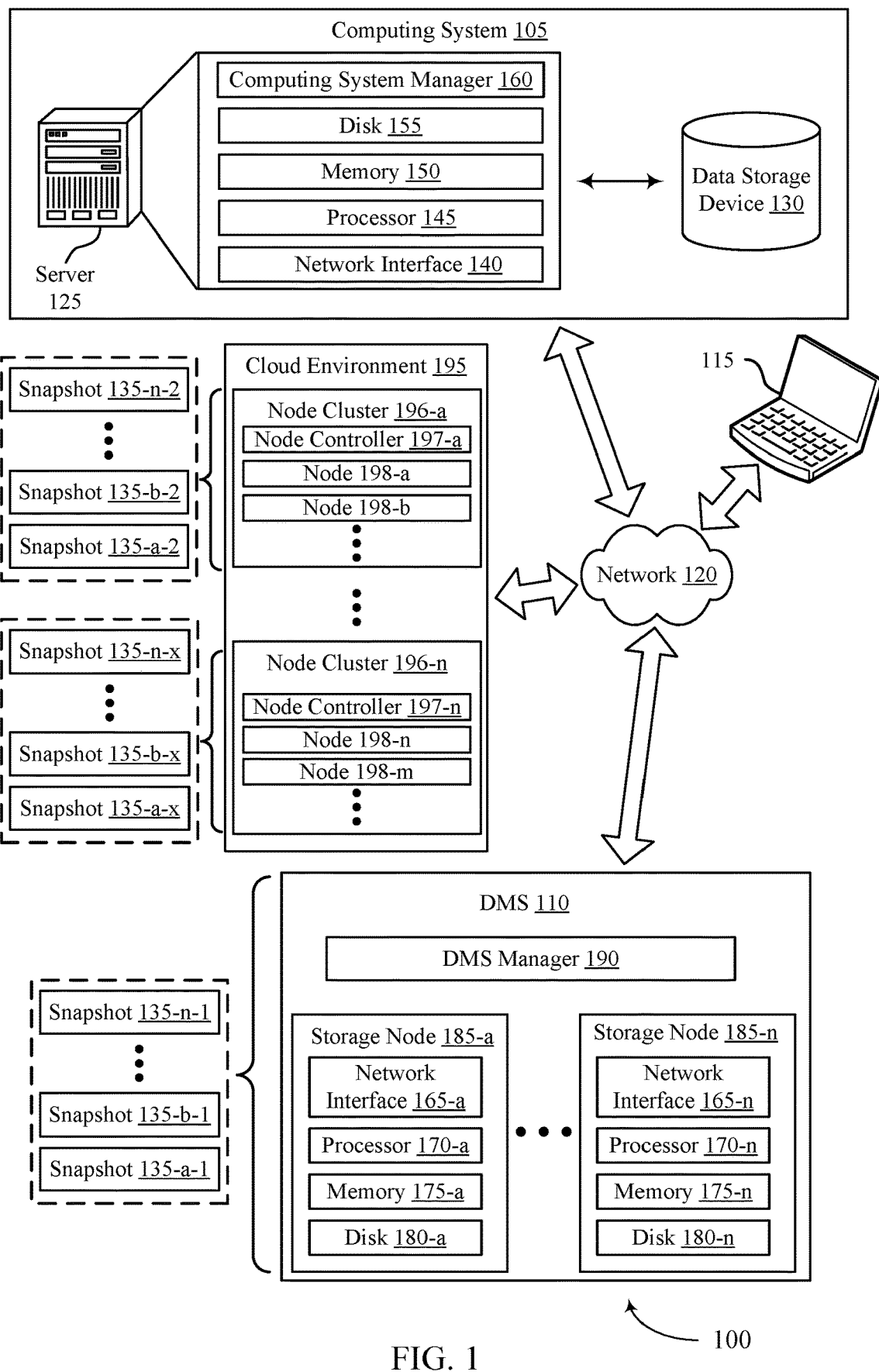
FIGS. 1 and 2 illustrate examples of computing environments that supports storage and retrieval of filesystem metadata in accordance with aspects of the present disclosure.

FIG. 1 illustrates an example of a computing environment 100 that supports storage and retrieval of filesystem metadata in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both.

Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The DMS 110 may generate metadata when capturing snapshots 135, for example, in the form of diff FMD files which contain information corresponding to files that have been created, deleted, modified, or otherwise changed since a prior snapshot. The DMS 110 may also capture or generate aggregated metadata (e.g., statistics) for snapshots 135 (e.g., the total number of files that changed since a prior snapshot, the total size of the snapshot, the total number of files in the snapshot). Along with supporting backup and recovery options, the DMS 110 may use machine learning techniques.

For example, machine learning techniques and experimentation may be used by the DMS 110 (e.g., administrators of the DMS 110) to perform data engineering to analyze metadata and gain useful insights on the backup process. For example, machine learning techniques may be used to predict or detect anomalies (e.g., ransomware or malware detection) based on the system metadata. For example, analysis metadata may be used to identify suspicious files, suspicious modifications, or suspicious deletions. As another example, machine learning experimentation may be used to train a machine learning application to detect anomalies based on the system metadata.

Filesystem metadata may be slow-changing and incremental, as metadata may indicate changes between subsequent snapshots of a same snappable. The metadata for an individual snapshot 135 may have millions of entries capturing changes across the filesystem, and as the DMS 110 may manage backup operations for a large quantity of clients (e.g., thousands of computing systems 105), the scale of the metadata across the DMS 110 may be large. For example, the quantity of metadata across all snapshots 135 captured by the DMS 110 in a single day may be in the billions. Accordingly, filtering and reading filesystem metadata to obtain a dataset for input to a machine learning application for training or anomaly detection purposes may be inefficient and time-intensive.

The DMS 110 may implement techniques for efficiently storing and organizing filesystem metadata for use with machine learning processes—e.g., to support efficiently extracting datasets useful for machine learning experimentation, training, or other purposes. To obtain a dataset, the DMS 110 may read metadata from different partitions of a storage environment (e.g., the cloud environment 195) in parallel, and accordingly, metadata may be stored in separate partitions based on customers and time ranges (e.g., to support such parallel reading with improved efficiency, among other possible benefits). Accordingly, when the DMS 110 receives a request to retrieve metadata that indicates a customer (or set of customers) and time range, the DMS 110 may identify the partitions that correspond to the indicated customer(s) and time range and may read the identified partitions in parallel. Thus, the requested metadata may be quickly identified and retrieved for feeding to a machine learning process. Accordingly, the DMS 110 may support bulk reads of aggregated statistics per snapshot 135 (e.g., overall churn statistics in a snapshot 135 or model evaluation metrics for snapshots 135). In addition, the metadata may be stored in a column-based format (e.g., Parquet) where the columns correspond to different types of metadata or different portions of files. Accordingly, if the request indicates a particular type of metadata, the DMS 110 may query the corresponding columns from the files in the partitions without reading entire files, thereby decreasing read time.

Figure 2:
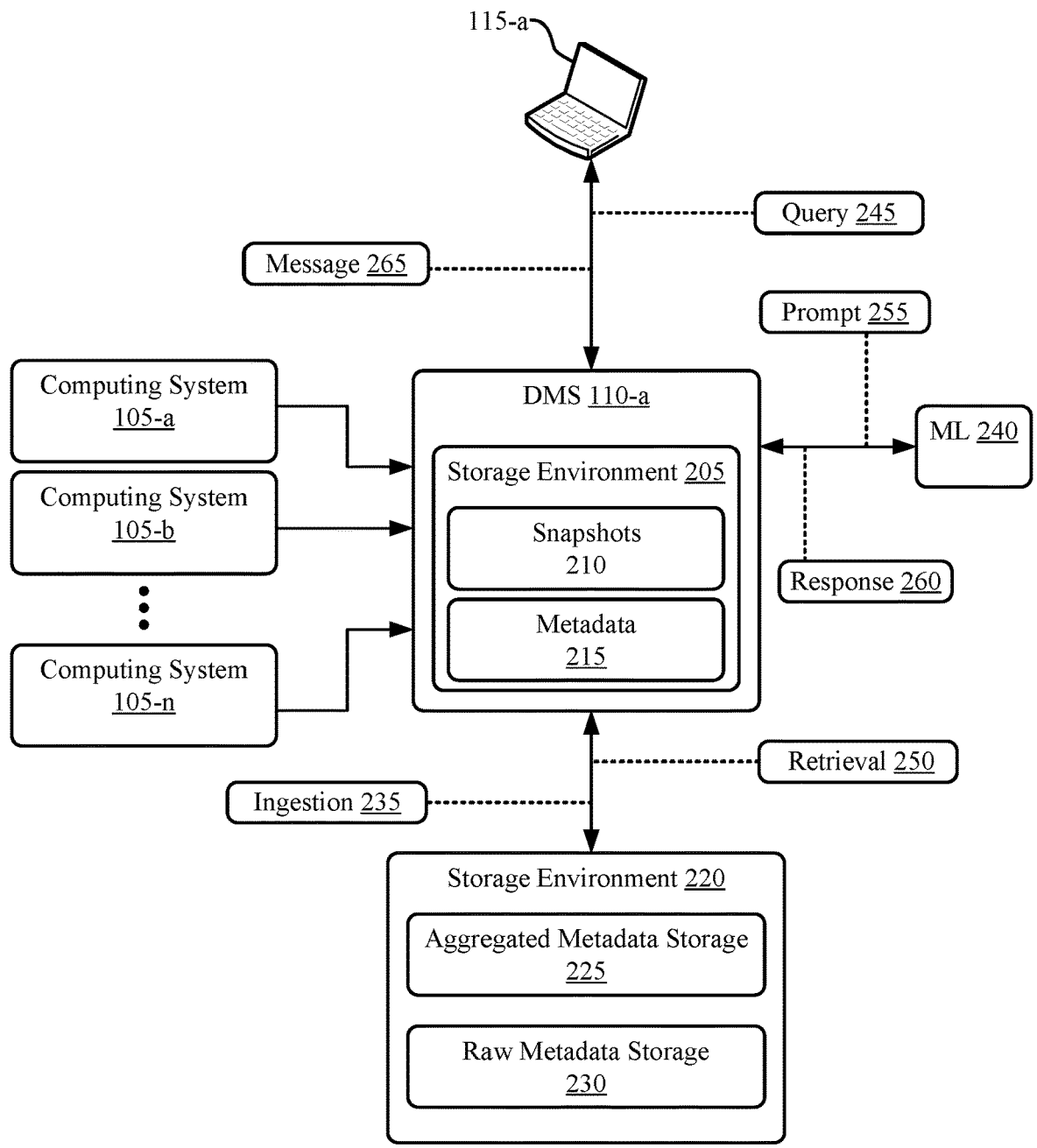

FIG. 2 shows an example of a computing environment 200 that supports storage and retrieval of filesystem metadata in accordance with aspects of the present disclosure. The computing environment 200 may implement one or more aspects of the computing environment 100. For example, the computing environment 200 includes a DMS 110-*a* and a computing device 115-*a*, which may be examples of a DMS 110 and a computing device 115 as described with reference to FIG. 1.

The DMS 110-*a* may perform backup and recovery operations for one or more computing systems 105 which may correspond to different clients or customers of the DMS 110-*a*. For example, the DMS 110-*a* may perform backup and recovery operations for a set of n computing systems including a computing system 105-*a*, a computing system 105-*b*, . . . , and a computing system 105-*n*. The DMS 110-*a* may capture snapshots 210 of the various computing systems 105 (e.g., in accordance with service level agreements (SLAs) for the various computing systems 105). The DMS 110-*a* may store the snapshots 210 in a storage environment 205, which may be an example of local storage nodes 185 at the DMS 110 as described herein or an external storage location, such as the cloud environment 195 as described herein. The DMS 110-*a* may generate metadata 215 when capturing snapshots, for example, in the form of differential filesystem metadata (diff FMD) files which contain information corresponding to files that have been created, deleted, modified, or otherwise changed since a prior snapshot. The metadata 215 may also include aggregated metadata (e.g., statistics) for snapshots 210 (e.g., the total number of files that changed since a prior snapshot, the total size of the snapshot, the total number of files in the snapshot 210).

The DMS 110-*a* may store the metadata 215, for example, as a part of the ingestion process 235 of the snapshots 210, in a storage environment 220 that enables efficient extraction, for example of the metadata 215 with machine learning processes. The storage environment 220 may be an example of local storage nodes 185 at the DMS 110 as described herein or an external storage location, such as the cloud environment 195 as described herein. The storage environment 220 may include an aggregated metadata storage 225 and a raw metadata storage 230. For example, the aggregated metadata storage 225 may be a first table and the raw metadata storage 230 may be a second table, and the storage formats of the first and second tables may be selected based on the use cases for the different types of metadata.

In the raw metadata storage 230, a row may correspond to a changed inode entry in a filesystem (e.g., file, directory). Each row may contain the file path, extension, file statistics (e.g., size, last modified time). Each row may also include snapshot identifiers (e.g., snapshot ID) and workload identifiers (e.g., snappable ID) to allow for analysis at the snapshot and workload level. The data in the raw metadata storage 230 may be stored in a raw unstructured format (e.g., in Google cloud storage buckets) which may reduce storage cost as compared to hosting the data on a live database. The data in the raw metadata storage 230 may be stored in a Parquet file format, which may allow for high bulk read performance and for filtering based on column values. For example, in the ingestion process, the DMS 110-*a* may convert the raw metadata (e.g., diffFMD files) into the Parquet file format. Data in the raw metadata storage 230 may be partitioned based on the customer account, deployment, and/or the date when the snapshot 210 corresponding to the raw data was captured by the DMS 110-*a*. Such partitioning may allow for filtering on a per-account, per deployment, and/or per time period filtering.

In the aggregated metadata storage 225, a row may contain aggregated statistics at a snapshot level. One row per snapshot 210 may reduce the scale as compared to the raw data in the raw metadata storage 230. The aggregated metadata storage 225 may use open source file formats and table formats to create a structured interface to query, process, and ingest the aggregated statistics adhering to a given schema and layout. For example, the aggregated metadata storage 225 may use an Apache Iceberg table format and the data files themselves stored in the aggregated metadata storage 225 may in the Parquet file format, which may be used for column-based queries. For example, queries for machine learning based prompts may involve certain columns, and the Parquet file format may allow for reading certain portions of files containing columns of interest. For example, in the ingestion process, the DMS 110-*a* may convert the generated aggregated statistics to the Parquet file format. The aggregated statistics in the aggregated metadata storage 225 may be partitioned based on the customer account, deployment, and/or the date (e.g., the month) when the snapshot 210 corresponding to the aggregated data was captured by the DMS 110-*a*. In some examples, the combination of the Apache Iceberg table format and the Parquet file format may increase the performance and scalability of analytical (e.g., online analytical processing (OLAP)) queries, for example, for machine learning based experimentation.

For example, the DMS 110-*a* may use machine learning techniques (e.g., such as a machine learning application 240) to perform data engineering to analyze metadata and gain useful insights on the backup process. For example, machine learning techniques may be used to predict or detect anomalies (e.g., ransomware or malware detection). For example, the DMS 110-*a* may receive a query 245 (e.g., from an administrator of the DMS 110-*a* at a computing device 115-*a*) as part of a communication session with a machine learning application 240. For example, the machine learning application 240 may be Apache Spark or a service interacting with a large language model (LLM). The query 245 may request or be indicative of metadata stored in the storage environment 220 for the DMS 110-*a* to retrieve and pass in a prompt to the machine learning application 240. For example, the query may indicate a customer or set of customers and a time range. Based on the query 245, the DMS 110-*a* may perform a retrieval 250 of the requested or indicated metadata from the storage environment 220. The DMS 110-*a* may transmit the retrieved metadata to the machine learning application 240 via a prompt 255. The machine learning application 240 may provide a response 260 to the prompt 255 based on the metadata included in the prompt. For example, the response 260 may include indications of predicted or detected anomalies. The DMS may provide a message 265 to the computing device 115-*a* (e.g., to the administrator) based on information included in the response 260. An administrator may take action in response to an anomaly indicated in the message 265.

In some examples, the DMS 110-*a* may ingest metadata 215 to the storage environment 220 on a periodic basis. As described herein, the metadata 215 may include information regarding which files in a given snapshot 210 have changed since a prior snapshot 210 of the same snappable (e.g., the same computing system 105 or same portion of the same computing system 105). Such information may be used by the machine learning application 240 to generate insights about anomalies such as ransomware attacks or data exfiltration in the user's environment (e.g., at the corresponding computing system 105). To use the metadata for machine learning training and experimentation (e.g., for use by the machine learning application 240), the most relevant features may be extracted from unstructured metadata and stored in a format that supports easy extraction and filtering. Each incremental metadata corresponding to a given snapshot 210 may range from a few kilobytes (KBs) to several gigabytes (GBs) as the incremental metadata may enumerate all files that change in a filesystem (which may have no upper bound). Such incremental data may be ingested and stored in the raw metadata storage 230 as described herein. The DMS 110-*a* may also generate and ingest aggregated statistics from the raw metadata into the aggregated metadata storage 225. For example, the aggregated statistics may include the total quantity of files deleted, the total quantity of files created (e.g., total overall, respective totals for one or more specific file types), and/or the total quantity of files modified per snapshot 210. The aggregated metadata storage 225 and the raw metadata storage 230 at the storage environment 220 may allow machine learning models (e.g., the machine learning application 240) to use both raw incremental metadata and aggregated statistics to perform experiments such as anomaly detection.

Machine learning experiments may be performed at a workload level (e.g., snappable level) or account level (e.g., customer level). For example, a unit of computation being performed on a given workload (e.g., snappable) may not query data from other workloads or accounts. In some examples, machine learning experiments may include bulk-delete data operations for a customer if the customer discontinues use of the DMS 110-a (e.g., deletes the corresponding account). In some examples, the DMS 110-a may periodically delete old or stale metadata from the storage environment 220 to comply with data retention policies (e.g., in accordance with an SLA). For example, the DMS 110-a may similarly delete old or stale snapshots 210 and metadata 215 from the storage environment 205.

The data files at the storage environment 220 may be organized in partitions for the most common types of queries for machine learning processes. For example, small partitions may not perform as large partitions as partitions may be read by the DMS 110-a in parallel, and thus small partitions may increase latency. Too large of partitions may result in inefficiencies based on filtering through larger data sets for the requested data. As described herein, the retrieval 250 of metadata for a prompt 255 may be time-range based, and the time ranges may be used to filter data as the metadata may be partitioned in the storage environment 220 based on the time at which the corresponding snapshot 210 was captured by the DMS 110-a.

The machine learning application 240 may perform operations in parallel. For example, the machine learning application 240 may be Apache Spark which may use the concept of data partitions to parallelize computations and combine results. When the data is loaded into an Apache Spark environment, Apache Spark may maintain the same partitioning scheme as found in the data files. Accordingly, organizing the data with partition sizes corresponding to partition sizes used by the machine learning application 240 may increase performance of machine learning experiments on metadata. For example, Apache Spark computation speed may be inversely proportional to the quantity of partitions loaded into memory. Accordingly, as described herein, partitions may be read by the DMS 110-a from the storage environment 220 in parallel (e.g., at the same time) and processed by the machine learning application 240 in parallel.

Thus, in some examples, partitions in the storage environment 220 may be organized such that data for a given account within a given time period is contained within one partition. For the raw metadata storage 230, the account (e.g., customer or client account) and date may be used as partition keys. For the aggregated metadata storage 225, the account and month may be used as partition keys. Using such partition keys may keep data file sizes in the storage environment 220 between 1 megabyte (MB) and 10 MBs in most cases, which may be an optimal size for the machine learning application 240. Partitioning based on account and time periods may also increase the efficiency of deletion of old or stale data and files. For example, time-range filter queries may be efficient as relevant partitions may quickly be found and loaded into memory during execution of a deletion operation. The aggregated metadata storage 225 may also maintain a metadata log of append operations and may be able to roll back the table to a state in the past.

The Parquet file format, which may be used to store files in the aggregated metadata storage 225 and the raw metadata storage 230, may be used for column-based storage, which may be beneficial for analytical workloads by allowing for fast query performance via reading of columns specific to a given query. The Parquet file format may work efficiently with big data processing engines such as Apache Spark.

As described herein, the filesystem metadata used for machine learning experimentation via the machine learning application 240 may be a large and slow-changing dataset. A table format may refer to the way data is organized within a table-like structure using a schema. The table format may include information such as field names, data types, and constraints of the data being stored. The aggregated metadata storage 225 and the raw metadata storage 230 may use a table format, such as Apache Iceberg, which stores data in incremental data files, allowing the aggregated metadata storage 225 and the raw metadata storage 230 to manage and query larger datasets more efficiently that if the data is stored in a non-incremental format. Further, aggregated metadata storage 225 and the raw metadata storage 230 may use a table format, such as Apache Iceberg, which supports schema evolution, enabling updates to the schema without rewriting the entire dataset.

The computing environment 200 may include multiple layers: an ingestion layer, a storage layer, and a consumption (or read application programming interface) layer. The ingestion layer may involve the capture of snapshots 210 by the DMS 110-a of the computing systems 105, the generation of the corresponding metadata 215, and the conversion of the metadata 215 into the formats for storage in the aggregated metadata storage 225 and the raw metadata storage 230. For example, the ingestion layer may involve a set of tools and periodic jobs to collate the filesystem metadata from the different customers (e.g., associated with the different computing systems 105) and ingest the metadata into the storage environment 220. The storage layer may include the storage environment 220 and may be managed by the Apache Iceberg table format and the Parquet file format. The read layer may include a set of tools (e.g., an application programming interface (API) library) to retrieve metadata from the storage environment 220 and transmit the retrieved metadata to the machine learning application 240. For example, the read layer may include Apache Spark connectors to Apache Iceberg and Parquet.

Figure 3:
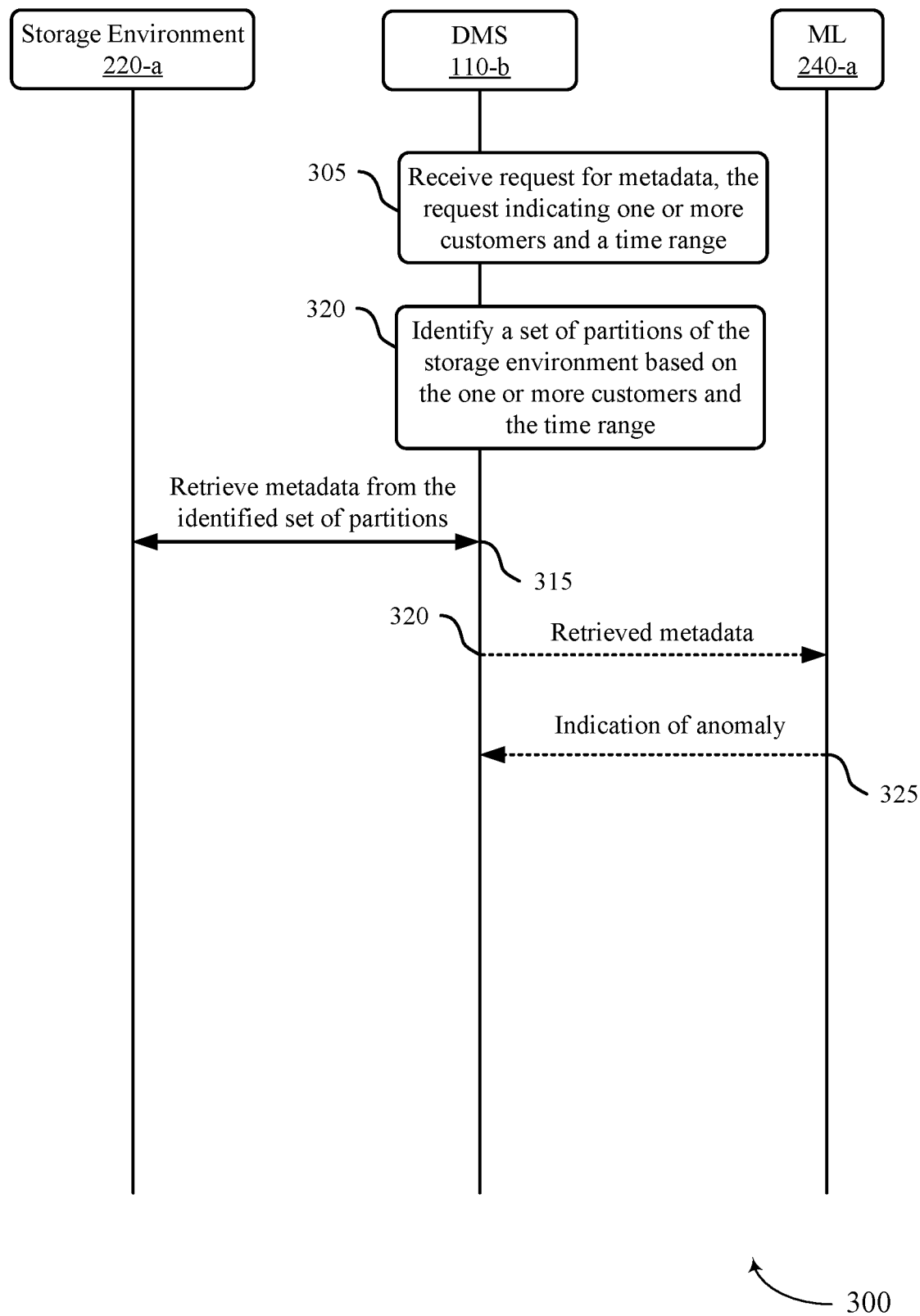
FIG. 3 shows an example of a process flow that supports storage and retrieval of filesystem metadata in accordance with aspects of the present disclosure.

FIG. 3 shows an example of a process flow 300 that supports storage and retrieval of filesystem metadata in accordance with aspects of the present disclosure. The process flow 300 may implement one or more aspects of the computing environment 100 or the computing environment 200. For example, the process flow may include a DMS 110-b, a storage environment 220-a, and a machine learning application 240-a, which may be examples of a DMS 110, a storage environment 220, and a machine learning application 240 as described herein. In the following description of the process flow 300, operations between the DMS 110-b, the storage environment 220-a, and the machine learning application 240-a may be added, omitted, or performed in a different order (with respect to the exemplary order shown).

At 305, the DMS 110-b may receive a request for metadata associated with one or more snapshots captured by the DMS 110-b of computing systems, where the request indicates one or more customers from a set of multiple customers of the DMS 110-*b* and further indicates a time range. For example, the DMS 110-*b* may provide backup and recovery services for the set of multiple customers which may involve capturing snapshots of computing systems in accordance with respective SLAs with the set of multiple customers.

At 310, the DMS 110-*b* may identify, based on the request at 305, a set of partitions of a set of multiple partitions of the storage environment 220-*a*, where the storage environment 220-*a* is accessible to the DMS 110-*b*, where the set of multiple partitions store respective sets of metadata associated with snapshots captured by the DMS 110-*b* for respective customers during respective time ranges, and where the set of partitions correspond to the one or more customers and the time range indicated by the request. For example, partitions in the storage environment 220-*a* may be organized by customer and time range.

At 315, the DMS 110-*b* may retrieve, from the storage environment 220-*a*, at least respective portions of the respective sets of metadata from the identified set of partitions in parallel.

In some examples, the respective sets of metadata are stored in the set of multiple partitions in a column-based format, and respective columns of the column-based format correspond to different respective information types. In some examples, receiving the request at 305 may involve identifying, by the DMS 110-*b*, one or more respective columns corresponding to one or more information types indicated in the request. In such examples, the DMS 110-*b* may retrieve respective subsets of the respective sets of metadata from the identified one or more respective columns, where the respective subsets correspond to the at least respective portions of the respective sets of metadata. In some examples, the one or more information types indicated in the request at 305 include modified files, created files, deleted files, modification times, snapshot identifiers, computing system identifiers, a total quantity of modified files, a total quantity of created files, a total quantity of deleted files, a total quantity of files, a snapshot size, or any combination thereof.

In some examples, the DMS 110-*b* may capture a first snapshot of a computing system (e.g., a computing system 105 as described herein), the one or more snapshots may include the first snapshot, and capture of the first snapshot may include generation of first metadata associated with the first snapshot. In such examples, the DMS 110-*b* may store the first snapshot in a second storage environment (e.g., the storage environment 205 as described herein), and the DMS 110-*b* may store the first metadata in one or more partitions of the set of multiple partitions based on a time at which the first snapshot is captured and a customer of the one or more customers associated with the first snapshot. In some examples, the DMS 110-*b* may convert, prior to storing the first metadata in the one or more partitions, the first metadata into a column-based format, where respective columns of the column-based format correspond to different respective information types. In some examples, the first metadata may include differential filesystem metadata file and an aggregated statistics file. In some examples, storing the first metadata in the one or more partitions of the set of multiple partitions includes: storing first data from the differential filesystem metadata file in a first table associated with raw data (e.g., the raw metadata storage 230 described herein); and storing second data from the aggregated statistics file in a second table associated with aggregated data (e.g., the aggregated metadata storage 225 described herein). In some examples, rows within the first table correspond to respective computing objects within one or more filesystem of the computing systems, and rows within the second table correspond to respective snapshots of the computing systems. In some examples, the differential filesystem metadata file indicates files subject to the first snapshot that have been modified, created, or deleted with respect to a prior snapshot of the computing system, a time indicator for the files in the first snapshot that have been modified, created, or deleted, a snapshot identifier, a computing system identifier, or any combination thereof, and the aggregated statistics file indicates a total quantity of files in the first snapshot that have been modified with respect to the prior snapshot, a total quantity of files in the first snapshot that have been created with respect to the prior snapshot, a total quantity of files in the first snapshot that have been deleted with respect to the prior snapshot, a total size of the first snapshot, a total quantity of files in the first snapshot, or any combination thereof.

In some examples, at 320, the DMS 110-*b* may transmit the at least respective portions of the respective sets of metadata to the machine learning application 240-*a*. In some examples, at 325, the DMS 110-*b* may receive, from the machine learning application 240-*a*, an indication of an anomaly associated with the one or more snapshots based on transmission of the at least respective portions of the respective sets of metadata. In some examples, the DMS 110-*b* may receive a query indicating one or more parameters for a dataset to transmit to the machine learning application, and the DMS 110-*b* may identify based on the one or more parameters, the one or more customers, the time range, or any combination thereof.

In some examples, the DMS 110-*b* may receive the request at 305 via a user interface associated the DMS 110-*b* (e.g., via a computing device 115 as described herein), such as a user interface used by a customer of the DMS 110-*b*, a user interface used by a developer of one or more applications associated with the DMS 110-*b*, or any other type of user interface that may be used to provide the request to the DMS 110-*b*. For example, administrators or developers for the DMS 110-*b* may initiate experiments or applications which may trigger the request at 305.

Figure 4:
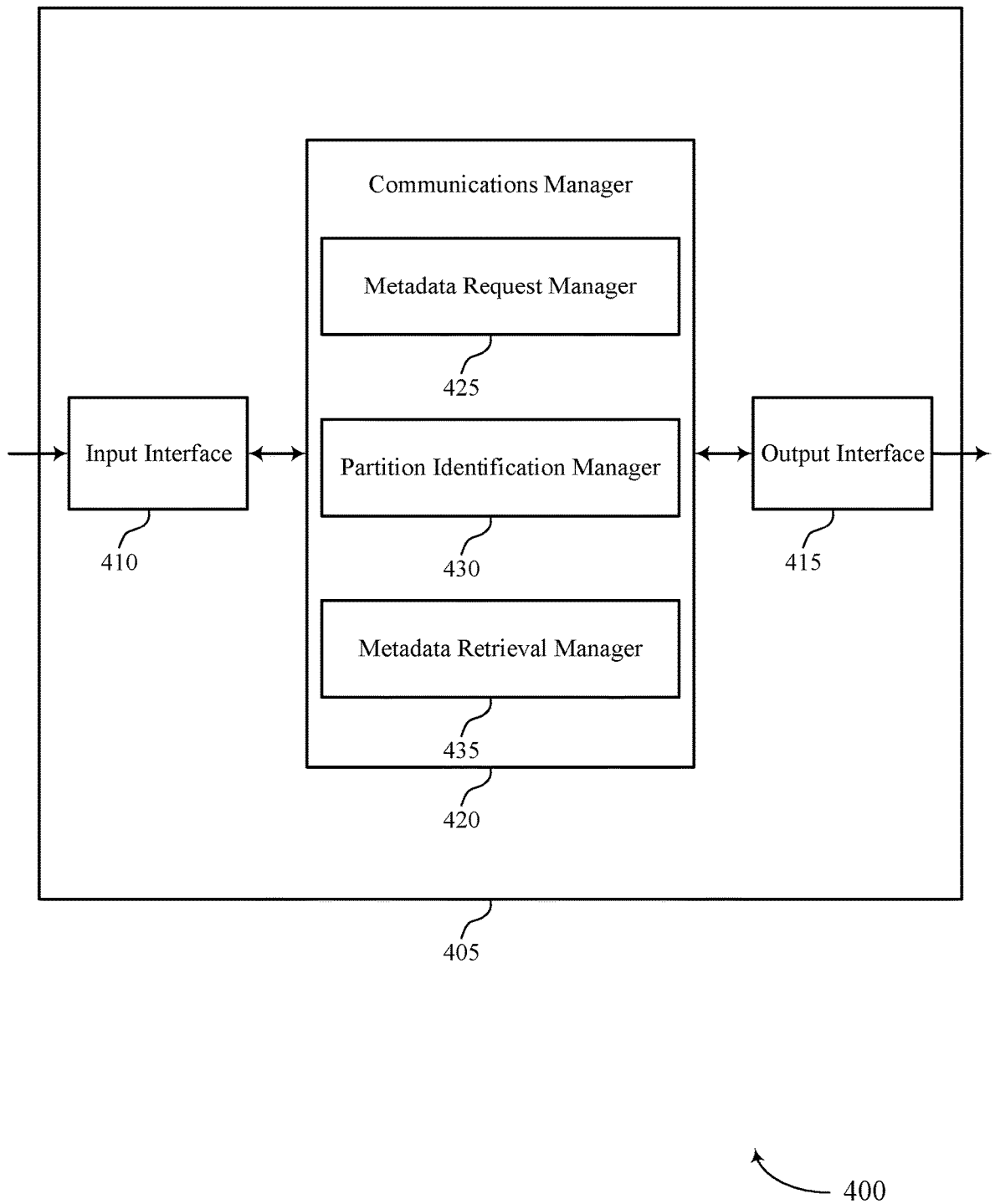
FIG. 4 shows a block diagram of an apparatus that supports storage and retrieval of filesystem metadata in accordance with aspects of the present disclosure.

FIG. 4 shows a block diagram 400 of a system 405 that supports storage and retrieval of filesystem metadata in accordance with aspects of the present disclosure. In some examples, the system 405 may be an example of aspects of one or more components described with reference to FIG. 1, such as a DMS 110. The system 405 may include an input interface 410, an output interface 415, and a communications manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the communications manager 420 to support storage and retrieval of filesystem metadata. In some cases, the input interface 410 may be a component of a network interface 625 as described with reference to FIG. 6.

The output interface 415 may manage output signaling for the system 405. For example, the output interface 415 may receive signaling from other components of the system 405, such as the communications manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the communications manager 420 may include a metadata request manager 425, a partition identification manager 430, a metadata retrieval manager 435, or any combination thereof. In some examples, the communications manager 420, or various components thereof, may be configured to perform various operations (e.g., receiving, monitoring, transmitting) using or otherwise in cooperation with the input interface 410, the output interface 415, or both. For example, the communications manager 420 may receive information from the input interface 410, send information to the output interface 415, or be integrated in combination with the input interface 410, the output interface 415, or both to receive information, transmit information, or perform various other operations as described herein.

The metadata request manager 425 may be configured as or otherwise support a means for receiving, by a DMS, a request for metadata associated with one or more snapshots of computing systems captured by the DMS, where the request indicates one or more customers from a set of multiple customers of the DMS and further indicates a time range. The partition identification manager 430 may be configured as or otherwise support a means for identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request. The metadata retrieval manager 435 may be configured as or otherwise support a means for retrieving, by the DMS, at least respective portions of the respective sets of metadata from the identified set of partitions in parallel.

Figure 5:
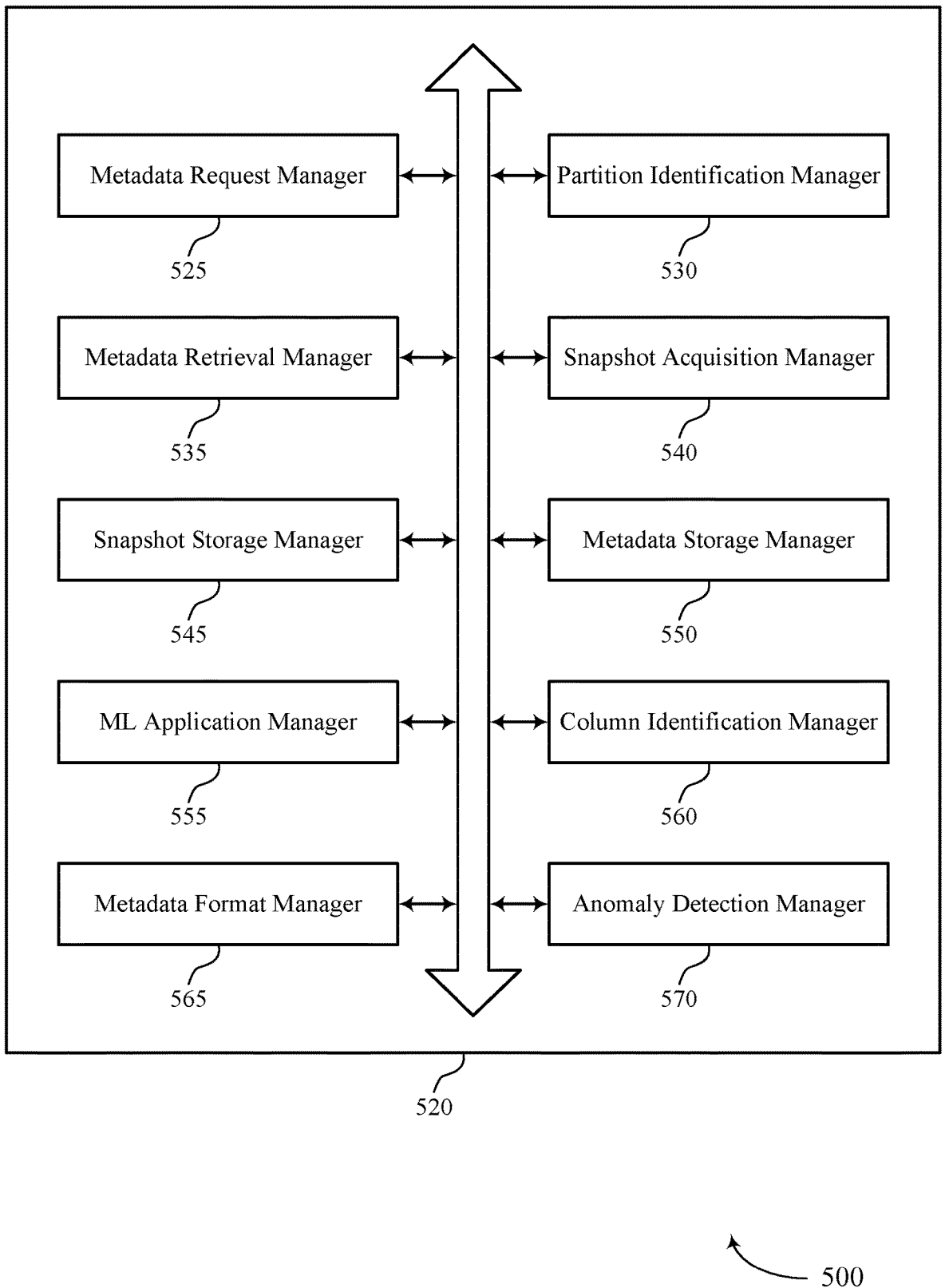
FIG. 5 shows a block diagram of a data management system (DMS) that supports storage and retrieval of filesystem metadata in accordance with aspects of the present disclosure.

FIG. 5 shows a block diagram 500 of a communications manager 520 that supports storage and retrieval of filesystem metadata in accordance with aspects of the present disclosure. The communications manager 520 may be an example of aspects of a DMS 110 or a communications manager 420, or both, as described herein. The communications manager 520, or various components thereof, may be an example of means for performing various aspects of storage and retrieval of filesystem metadata as described herein. For example, the communications manager 520 may include a metadata request manager 525, a partition identification manager 530, a metadata retrieval manager 535, a snapshot acquisition manager 540, a snapshot storage manager 545, a metadata storage manager 550, an ML application manager 555, a column identification manager 560, a metadata format manager 565, an anomaly detection manager 570, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The metadata request manager 525 may be configured as or otherwise support a means for receiving, by a DMS, a request for metadata associated with one or more snapshots of computing systems captured by the DMS, where the request indicates one or more customers from a set of multiple customers of the DMS and further indicates a time range. The partition identification manager 530 may be configured as or otherwise support a means for identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request. The metadata retrieval manager 535 may be configured as or otherwise support a means for retrieving, by the DMS, at least respective portions of the respective sets of metadata from the identified set of partitions in parallel.

In some examples, the respective sets of metadata are stored in the set of multiple partitions in a column-based format. In some examples, respective columns of the column-based format correspond to different respective information types.

In some examples, to support receiving the request, the column identification manager 560 may be configured as or otherwise support a means for identifying, by the DMS, one or more respective columns corresponding to one or more information types indicated in the request. In some examples, to support receiving the request, the metadata retrieval manager 535 may be configured as or otherwise support a means for retrieving, by the DMS, respective subsets of the respective sets of metadata from the identified one or more respective columns, where the respective subsets correspond to the at least respective portions of the respective sets of metadata.

In some examples, the one or more information types indicated in the request include modified files, created files, deleted files, modification times, snapshot identifiers, computing system identifiers, a total quantity of modified files, a total quantity of created files, a total quantity of deleted files, a total quantity of files, a snapshot size, or any combination thereof.

In some examples, the snapshot acquisition manager 540 may be configured as or otherwise support a means for capturing, by the DMS, a first snapshot of a computing system, the one or more snapshots including the first snapshot, where capture of the first snapshot includes generation of first metadata associated with the first snapshot. In some examples, the snapshot storage manager 545 may be configured as or otherwise support a means for storing the first snapshot in a second storage environment. In some examples, the metadata storage manager 550 may be configured as or otherwise support a means for storing the first metadata in one or more partitions of the set of multiple partitions based on a time at which the first snapshot is captured and a customer of the one or more customers associated with the first snapshot.

In some examples, the metadata format manager 565 may be configured as or otherwise support a means for converting, prior to storing the first metadata in the one or more partitions, the first metadata into a column-based format, where respective columns of the column-based format correspond to different respective information types.

In some examples, the first metadata includes a differential filesystem metadata file and an aggregated statistics file.

In some examples, to support storing the first metadata in the one or more partitions of the set of multiple partitions, the metadata storage manager 550 may be configured as or otherwise support a means for storing first data from the differential filesystem metadata file in a first table associated with raw data. In some examples, to support storing the first metadata in the one or more partitions of the set of multiple partitions, the metadata storage manager 550 may be configured as or otherwise support a means for storing second data from the aggregated statistics file in a second table associated with aggregated data.

In some examples, rows within the first table correspond to respective computing objects within one or more filesystem of the computing systems. In some examples, rows within the second table correspond to respective snapshots of the computing systems.

In some examples, the differential filesystem metadata file indicates files subject to the first snapshot that have been modified, created, or deleted with respect to a prior snapshot of the computing system, a time indicator for the files in the first snapshot that have been modified, created, or deleted, a snapshot identifier, a computing system identifier, or any combination thereof. In some examples, the aggregated statistics file indicates a total quantity of files in the first snapshot that have been modified with respect to the prior snapshot, a total quantity of files in the first snapshot that have been created with respect to the prior snapshot, a total quantity of files in the first snapshot that have been deleted with respect to the prior snapshot, a total size of the first snapshot, a total quantity of files in the first snapshot, or any combination thereof.

In some examples, the ML application manager 555 may be configured as or otherwise support a means for transmitting, by the DMS, the at least respective portions of the respective sets of metadata to a machine learning application.

In some examples, to support receiving the request, the metadata request manager 525 may be configured as or otherwise support a means for receiving the request via a user interface associated with an administrative account of the DMS.

In some examples, to support receiving the request, the metadata request manager 525 may be configured as or otherwise support a means for receiving, by the DMS, a query indicating one or more parameters for a dataset to transmit to the machine learning application. In some examples, to support receiving the request, the metadata request manager 525 may be configured as or otherwise support a means for identifying, by the DMS and based on the one or more parameters, the one or more customers, the time range, or any combination thereof.

In some examples, the anomaly detection manager 570 may be configured as or otherwise support a means for receiving, by the DMS and from the machine learning application, an indication of an anomaly associated with the one or more snapshots based on transmission of the at least respective portions of the respective sets of metadata.

Figure 6:
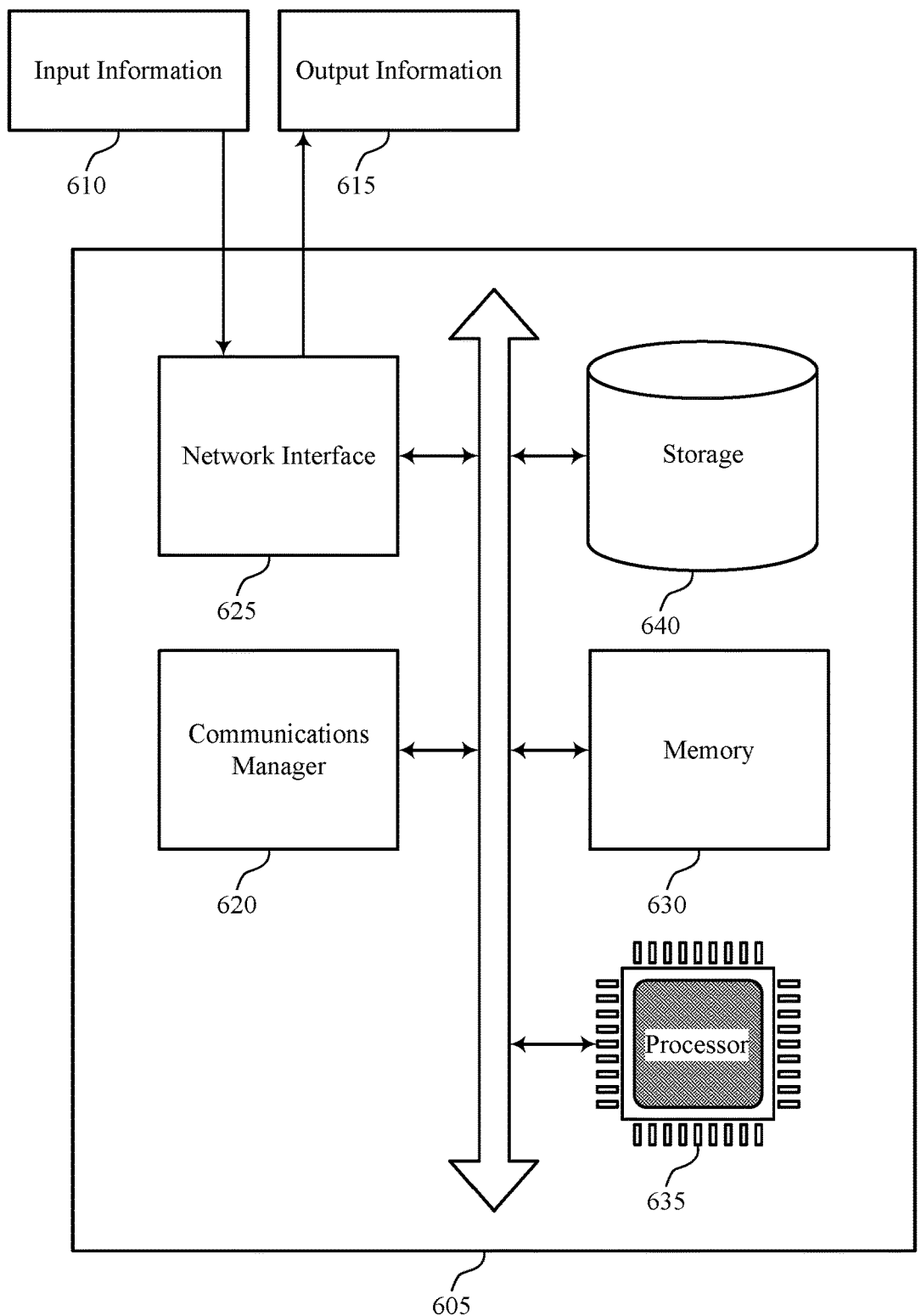
FIG. 6 shows a diagram of a system including a device that supports storage and retrieval of filesystem metadata in accordance with aspects of the present disclosure.

FIG. 6 shows a block diagram 600 of a system 605 that supports storage and retrieval of filesystem metadata in accordance with aspects of the present disclosure. The system 605 may be an example of or include the components of a system 405 as described herein. The system 605 may include components for data management, including components such as a communications manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting storage and retrieval of filesystem metadata). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the communications manager 620 may be configured as or otherwise support a means for receiving, by a DMS, a request for metadata associated with one or more snapshots of computing systems captured by the DMS, where the request indicates one or more customers from a set of multiple customers of the DMS and further indicates a time range. The communications manager 620 may be configured as or otherwise support a means for identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request. The communications manager 620 may be configured as or otherwise support a means for retrieving, by the DMS, at least respective portions of the respective sets of metadata from the identified set of partitions in parallel.

By including or configuring the communications manager 620 in accordance with examples as described herein, the system 605 may support techniques for storage and retrieval of filesystem metadata, which may provide one or more benefits such as, for example, (e.g., improved reliability, reduced latency, improved user experience, more efficient utilization of computing resources, network resources or both, improved scalability, or improved security), among other possibilities.

Figure 7:
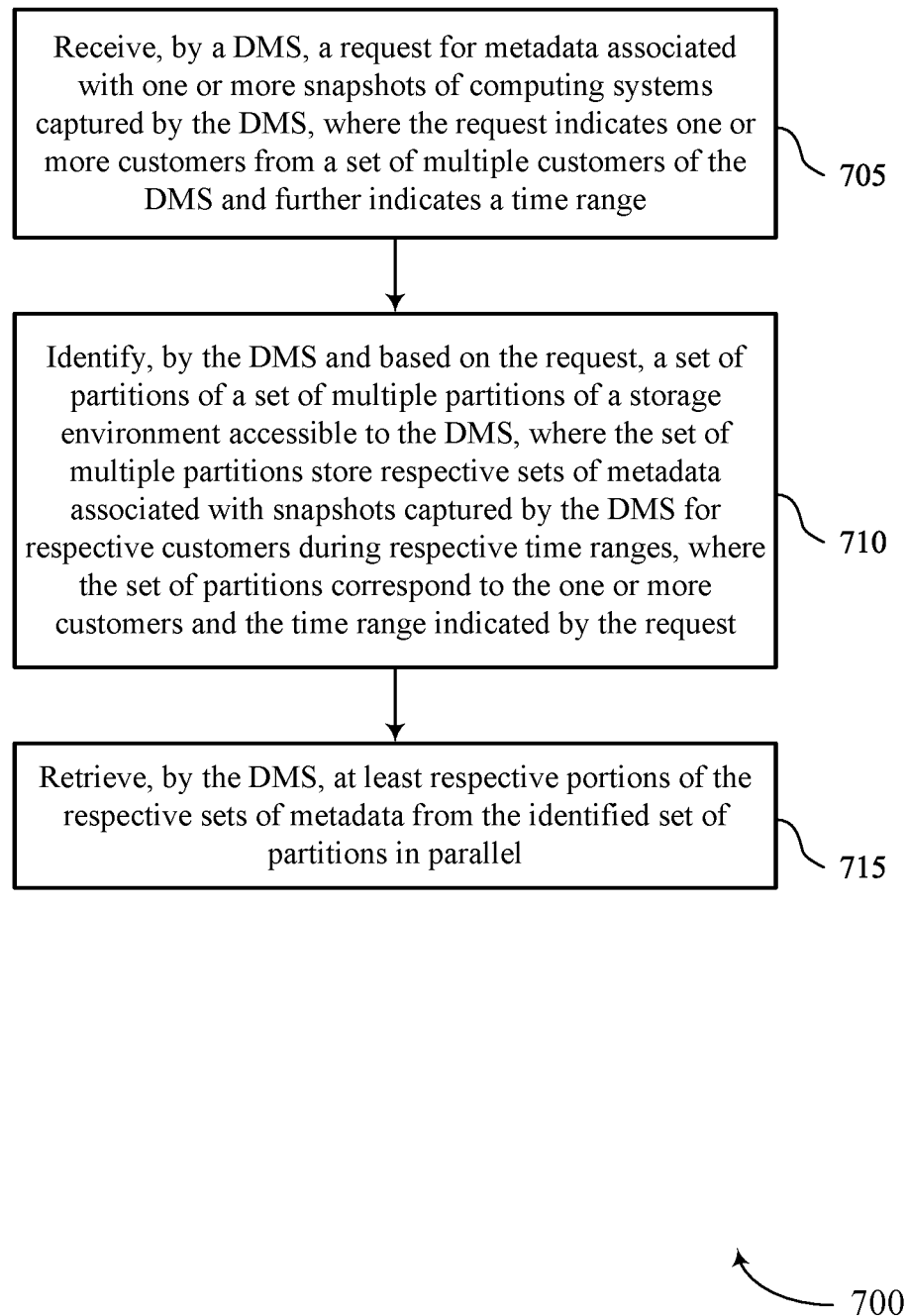
FIGS. 7 and 8 show flowcharts illustrating methods that support storage and retrieval of filesystem metadata in accordance with aspects of the present disclosure.

FIG. 7 shows a flowchart illustrating a method 700 that supports storage and retrieval of filesystem metadata in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, by a DMS, a request for metadata associated with one or more snapshots of computing systems captured by the DMS, where the request indicates one or more customers from a set of multiple customers of the DMS and further indicates a time range. The operations of block 705 may be performed in accordance with examples as disclosed herein. In some examples, aspects of the operations of 705 may be performed by a metadata request manager 525 as described with reference to FIG. 5.

At 710, the method may include identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request. The operations of block 710 may be performed in accordance with examples as disclosed herein. In some examples, aspects of the operations of 710 may be performed by a partition identification manager 530 as described with reference to FIG. 5.

At 715, the method may include retrieving, by the DMS, at least respective portions of the respective sets of metadata from the identified set of partitions in parallel. The operations of block 715 may be performed in accordance with examples as disclosed herein. In some examples, aspects of the operations of 715 may be performed by a metadata retrieval manager 535 as described with reference to FIG. 5.

Figure 8:
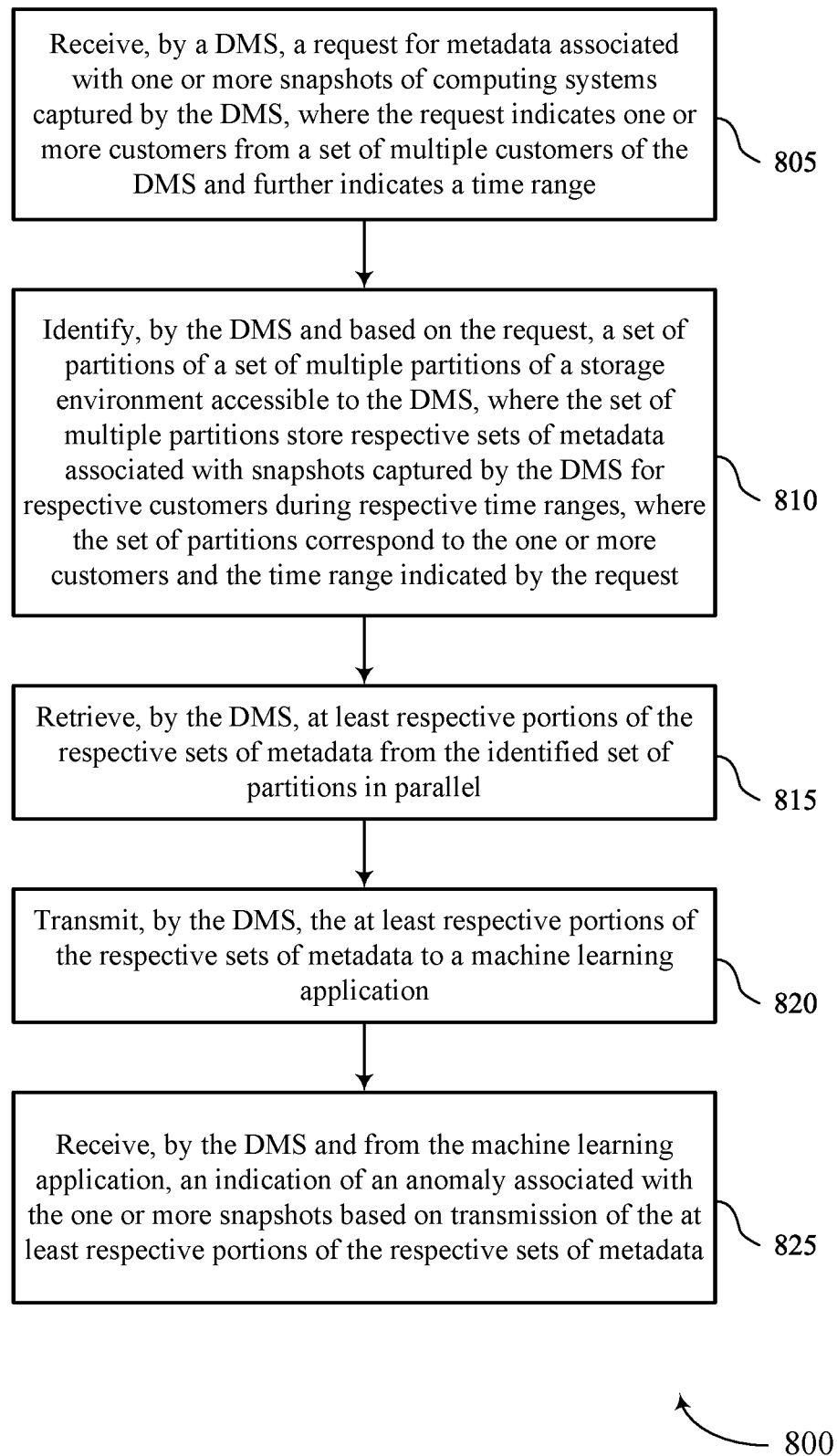

FIG. 8 shows a flowchart illustrating a method 800 that supports storage and retrieval of filesystem metadata in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving, by a DMS, a request for metadata associated with one or more snapshots of computing systems captured by the DMS, where the request indicates one or more customers from a set of multiple customers of the DMS and further indicates a time range. The operations of block 805 may be performed in accordance with examples as disclosed herein. In some examples, aspects of the operations of 805 may be performed by a metadata request manager 525 as described with reference to FIG. 5.

At 810, the method may include identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request. The operations of block 810 may be performed in accordance with examples as disclosed herein. In some examples, aspects of the operations of 810 may be performed by a partition identification manager 530 as described with reference to FIG. 5.

At 815, the method may include retrieving, by the DMS, at least respective portions of the respective sets of metadata from the identified set of partitions in parallel. The operations of block 815 may be performed in accordance with examples as disclosed herein. In some examples, aspects of the operations of 815 may be performed by a metadata retrieval manager 535 as described with reference to FIG. 5.

At 820, the method may include transmitting, by the DMS, the at least respective portions of the respective sets of metadata to a machine learning application. The operations of block 820 may be performed in accordance with examples as disclosed herein. In some examples, aspects of the operations of 820 may be performed by an ML application manager 555 as described with reference to FIG. 5.

At 825, the method may include receiving, by the DMS and from the machine learning application, an indication of an anomaly associated with the one or more snapshots based on transmission of the at least respective portions of the respective sets of metadata. The operations of block 825 may be performed in accordance with examples as disclosed herein. In some examples, aspects of the operations of 825 may be performed by an anomaly detection manager 570 as described with reference to FIG. 5.

A method by an apparatus is described. The method may include receiving, by a DMS, a request for metadata associated with one or more snapshots of computing systems captured by the DMS, where the request indicates one or more customers from a set of multiple customers of the DMS and further indicates a time range, identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request, and retrieving, by the DMS, at least respective portions of the respective sets of metadata from the identified set of partitions in parallel.

An apparatus is described. The apparatus may include one or more memories storing processor executable code, and one or more processors coupled with the one or more memories. The one or more processors may individually or collectively operable to execute the code to cause the apparatus to receive, by a DMS, a request for metadata associated with one or more snapshots of computing systems captured by the DMS, where the request indicates one or more customers from a set of multiple customers of the DMS and further indicates a time range, identify, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request, and retrieve, by the DMS, at least respective portions of the respective sets of metadata from the identified set of partitions in parallel.

Another apparatus is described. The apparatus may include means for receiving, by a DMS, a request for metadata associated with one or more snapshots of computing systems captured by the DMS, where the request indicates one or more customers from a set of multiple customers of the DMS and further indicates a time range, means for identifying, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request, and means for retrieving, by the DMS, at least respective portions of the respective sets of metadata from the identified set of partitions in parallel.

A non-transitory computer-readable medium storing code is described. The code may include instructions executable by one or more processors to receive, by a DMS, a request for metadata associated with one or more snapshots of computing systems captured by the DMS, where the request indicates one or more customers from a set of multiple customers of the DMS and further indicates a time range, identify, by the DMS and based on the request, a set of partitions of a set of multiple partitions of a storage environment accessible to the DMS, where the set of multiple partitions store respective sets of metadata associated with snapshots captured by the DMS for respective customers during respective time ranges, where the set of partitions correspond to the one or more customers and the time range indicated by the request, and retrieve, by the DMS, at least respective portions of the respective sets of metadata from the identified set of partitions in parallel.

In some examples of the method, apparatus, and non-transitory computer-readable medium described herein, the respective sets of metadata may be stored in the set of multiple partitions in a column-based format and respective columns of the column-based format correspond to different respective information types.

In some examples of the method, apparatus, and non-transitory computer-readable medium described herein, operations, features, means, or instructions for receiving the request may include operations, features, means, or instructions for identifying, by the DMS, one or more respective columns corresponding to one or more information types indicated in the request and retrieving, by the DMS, respective subsets of the respective sets of metadata from the identified one or more respective columns, where the respective subsets correspond to the at least respective portions of the respective sets of metadata.

In some examples of the method, apparatus, and non-transitory computer-readable medium described herein, the one or more information types indicated in the request include modified files, created files, deleted files, modification times, snapshot identifiers, computing system identifiers, a total quantity of modified files, a total quantity of created files, a total quantity of deleted files, a total quantity of files, a snapshot size, or any combination thereof.

Some examples of the method, apparatus, and non-transitory computer-readable medium described herein may further include operations, features, means, or instructions for capturing, by the DMS, a first snapshot of a computing system, the one or more snapshots including the first snapshot, where capture of the first snapshot includes generation of first metadata associated with the first snapshot, storing the first snapshot in a second storage environment, and storing the first metadata in one or more partitions of the set of multiple partitions based on a time at which the first snapshot may be captured and a customer of the one or more customers associated with the first snapshot.

Some examples of the method, apparatus, and non-transitory computer-readable medium described herein may further include operations, features, means, or instructions for converting, prior to storing the first metadata in the one or more partitions, the first metadata into a column-based format, where respective columns of the column-based format correspond to different respective information types.

In some examples of the method, apparatus, and non-transitory computer-readable medium described herein, the first metadata includes a differential filesystem metadata file and an aggregated statistics file.

In some examples of the method, apparatus, and non-transitory computer-readable medium described herein, operations, features, means, or instructions for storing the first metadata in the one or more partitions of the set of multiple partitions may include operations, features, means, or instructions for storing first data from the differential filesystem metadata file in a first table associated with raw data and storing second data from the aggregated statistics file in a second table associated with aggregated data.

In some examples of the method, apparatus, and non-transitory computer-readable medium described herein, rows within the first table correspond to respective computing objects within one or more filesystem of the computing systems, and rows within the second table correspond to respective snapshots of the computing systems.

In some examples of the method, apparatus, and non-transitory computer-readable medium described herein, the differential filesystem metadata file indicates files subject to the first snapshot that may have been modified, created, or deleted with respect to a prior snapshot of the computing system, a time indicator for the files in the first snapshot that may have been modified, created, or deleted, a snapshot identifier, a computing system identifier, or any combination thereof, and the aggregated statistics file indicates a total quantity of files in the first snapshot that may have been modified with respect to the prior snapshot, a total quantity of files in the first snapshot that may have been created with respect to the prior snapshot, a total quantity of files in the first snapshot that may have been deleted with respect to the prior snapshot, a total size of the first snapshot, a total quantity of files in the first snapshot, or any combination thereof.

Some examples of the method, apparatus, and non-transitory computer-readable medium described herein may further include operations, features, means, or instructions for transmitting, by the DMS, the at least respective portions of the respective sets of metadata to a machine learning application.

In some examples of the method, apparatus, and non-transitory computer-readable medium described herein, operations, features, means, or instructions for receiving the request may include operations, features, means, or instructions for receiving the request via a user interface associated with an administrative account of the DMS.

In some examples of the method, apparatus, and non-transitory computer-readable medium described herein, operations, features, means, or instructions for receiving the request may include operations, features, means, or instructions for receiving, by the DMS, a query indicating one or more parameters for a dataset to transmit to the machine learning application and identifying, by the DMS and based on the one or more parameters, the one or more customers, the time range, or any combination thereof.

Some examples of the method, apparatus, and non-transitory computer-readable medium described herein may further include operations, features, means, or instructions for receiving, by the DMS and from the machine learning application, an indication of an anomaly associated with the one or more snapshots based on transmission of the at least respective portions of the respective sets of metadata.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, by a data management system (DMS), a request for metadata associated with one or more snapshots of computing systems captured by the DMS, wherein the request indicates one or more customers from a plurality of customers of the DMS and further indicates a time range;
   identifying, by the DMS and based at least in part on the request, a set of partitions of a plurality of partitions of a storage environment accessible to the DMS, wherein the plurality of partitions store respective sets of metadata associated with snapshots captured by the DMS for respective customers during respective time ranges, wherein the set of partitions correspond to the one or more customers and the time range indicated by the request; and
   retrieving, by the DMS, at least respective portions of the respective sets of metadata from the identified set of partitions in parallel.

2. The method of claim 1, wherein:
   the respective sets of metadata are stored in the plurality of partitions in a column-based format, and
   respective columns of the column-based format correspond to different respective information types.

3. The method of claim 2, wherein receiving the request comprises:
   identifying, by the DMS, one or more respective columns corresponding to one or more information types indicated in the request; and
   retrieving, by the DMS, respective subsets of the respective sets of metadata from the identified one or more respective columns, wherein the respective subsets correspond to the at least respective portions of the respective sets of metadata.

4. The method of claim 3, wherein the one or more information types indicated in the request comprise modified files, created files, deleted files, modification times, snapshot identifiers, computing system identifiers, a total quantity of modified files, a total quantity of created files, a total quantity of deleted files, a total quantity of files, a snapshot size, or any combination thereof.

5. The method of claim 1, further comprising:
   capturing, by the DMS, a first snapshot of a computing system, the one or more snapshots comprising the first snapshot, wherein capture of the first snapshot comprises generation of first metadata associated with the first snapshot;
   storing the first snapshot in a second storage environment; and
   storing the first metadata in one or more partitions of the plurality of partitions based at least in part on a time at which the first snapshot is captured and a customer of the one or more customers associated with the first snapshot.

6. The method of claim 5, further comprising:
   converting, prior to storing the first metadata in the one or more partitions, the first metadata into a column-based format, wherein respective columns of the column-based format correspond to different respective information types.

7. The method of claim 5, wherein the first metadata comprises a differential filesystem metadata file and an aggregated statistics file.

8. The method of claim 7, wherein storing the first metadata in the one or more partitions of the plurality of partitions comprises:
   storing first data from the differential filesystem metadata file in a first table associated with raw data; and
   storing second data from the aggregated statistics file in a second table associated with aggregated data.

9. The method of claim 8, wherein:
   rows within the first table correspond to respective computing objects within one or more filesystem of the computing systems, and
   rows within the second table correspond to respective snapshots of the computing systems.

10. The method of claim 7, wherein:
    the differential filesystem metadata file indicates files subject to the first snapshot that have been modified, created, or deleted with respect to a prior snapshot of the computing system, a time indicator for the files in the first snapshot that have been modified, created, or deleted, a snapshot identifier, a computing system identifier, or any combination thereof, and
    the aggregated statistics file indicates a total quantity of files in the first snapshot that have been modified with respect to the prior snapshot, a total quantity of files in the first snapshot that have been created with respect to the prior snapshot, a total quantity of files in the first snapshot that have been deleted with respect to the prior snapshot, a total size of the first snapshot, a total quantity of files in the first snapshot, or any combination thereof.

11. The method of claim 1, further comprising:
    transmitting, by the DMS, the at least respective portions of the respective sets of metadata to a machine learning application.

12. The method of claim 11, wherein receiving the request comprises:
    receiving the request via a user interface associated with an administrative account of the DMS.

13. The method of claim 11, wherein receiving the request comprises:
  receiving, by the DMS, a query indicating one or more parameters for a dataset to transmit to the machine learning application; and
  identifying, by the DMS and based at least in part on the one or more parameters, the one or more customers, the time range, or any combination thereof.

14. The method of claim 11, further comprising:
  receiving, by the DMS and from the machine learning application, an indication of an anomaly associated with the one or more snapshots based at least in part on transmission of the at least respective portions of the respective sets of metadata.

15. An apparatus, comprising:
  one or more memories storing processor-executable code; and
  one or more processors coupled with the one or more memories and individually or collectively operable to execute the code to cause the apparatus to:
    receive, by a data management system (DMS), a request for metadata associated with one or more snapshots of computing systems captured by the DMS, wherein the request indicates one or more customers from a plurality of customers of the DMS and further indicates a time range;
    identify, by the DMS and based at least in part on the request, a set of partitions of a plurality of partitions of a storage environment accessible to the DMS, wherein the plurality of partitions store respective sets of metadata associated with snapshots captured by the DMS for respective customers during respective time ranges, wherein the set of partitions correspond to the one or more customers and the time range indicated by the request; and
    retrieve, by the DMS, at least respective portions of the respective sets of metadata from the identified set of partitions in parallel.

16. The apparatus of claim 15, wherein:
  the respective sets of metadata are stored in the plurality of partitions in a column-based format, and
  respective columns of the column-based format correspond to different respective information types.

17. The apparatus of claim 16, wherein, to receive the request, the one or more processors are individually or collectively operable to execute the code to cause the apparatus to:
  identify, by the DMS, one or more respective columns corresponding to one or more information types indicated in the request; and
  retrieve, by the DMS, respective subsets of the respective sets of metadata from the identified one or more respective columns, wherein the respective subsets correspond to the at least respective portions of the respective sets of metadata.

18. The apparatus of claim 17, wherein the one or more information types indicated in the request comprise modified files, created files, deleted files, modification times, snapshot identifiers, computing system identifiers, a total quantity of modified files, a total quantity of created files, a total quantity of deleted files, a total quantity of files, a snapshot size, or any combination thereof.

19. The apparatus of claim 15, wherein the one or more processors are individually or collectively further operable to execute the code to cause the apparatus to:
  capture, by the DMS, a first snapshot of a computing system, the one or more snapshots comprising the first snapshot, wherein capture of the first snapshot comprises generation of first metadata associated with the first snapshot;
  store the first snapshot in a second storage environment; and
  store the first metadata in one or more partitions of the plurality of partitions based at least in part on a time at which the first snapshot is captured and a customer of the one or more customers associated with the first snapshot.

20. A non-transitory computer-readable medium storing code, the code comprising instructions executable by one or more processors to:
  receive, by a data management system (DMS), a request for metadata associated with one or more snapshots of computing systems captured by the DMS, wherein the request indicates one or more customers from a plurality of customers of the DMS and further indicates a time range;
  identify, by the DMS and based at least in part on the request, a set of partitions of a plurality of partitions of a storage environment accessible to the DMS, wherein the plurality of partitions store respective sets of metadata associated with snapshots captured by the DMS for respective customers during respective time ranges, wherein the set of partitions correspond to the one or more customers and the time range indicated by the request; and
  retrieve, by the DMS, at least respective portions of the respective sets of metadata from the identified set of partitions in parallel.

* * * * *